Feb. 16, 1937.  G. W. SCOTT ET AL  2,070,964
TRACK LEVELER FOR TRACTORS
Filed Aug. 10, 1936   3 Sheets-Sheet 1
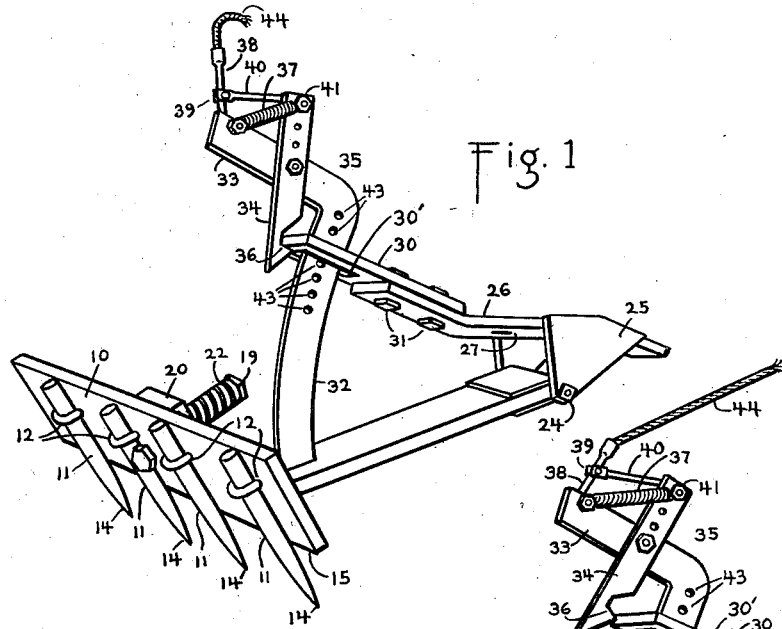
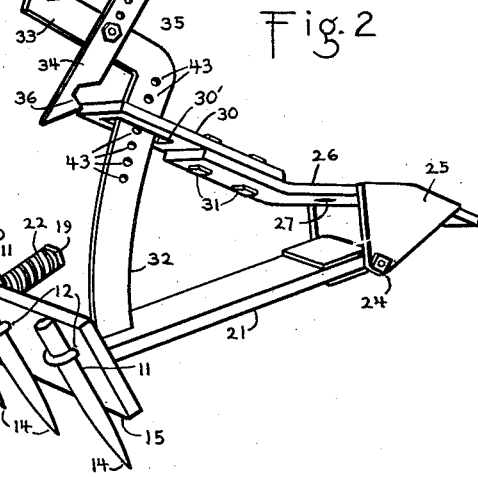
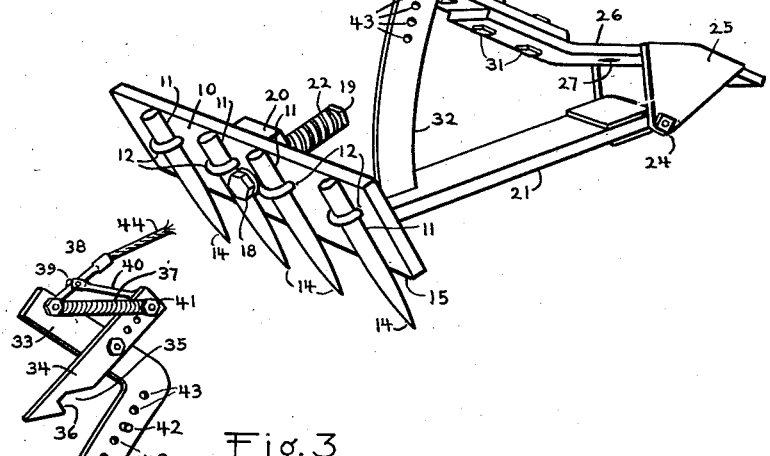
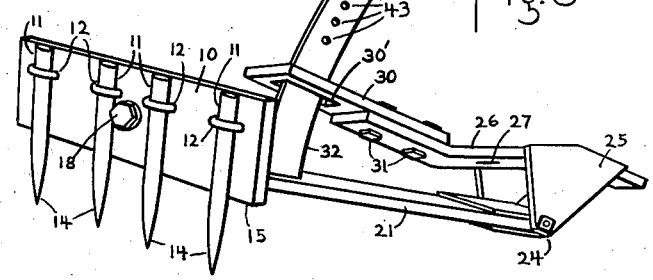
Glen W. Scott
Arch Frizzell
INVENTORS.
BY G. Lorenze Miller
ATTORNEY.

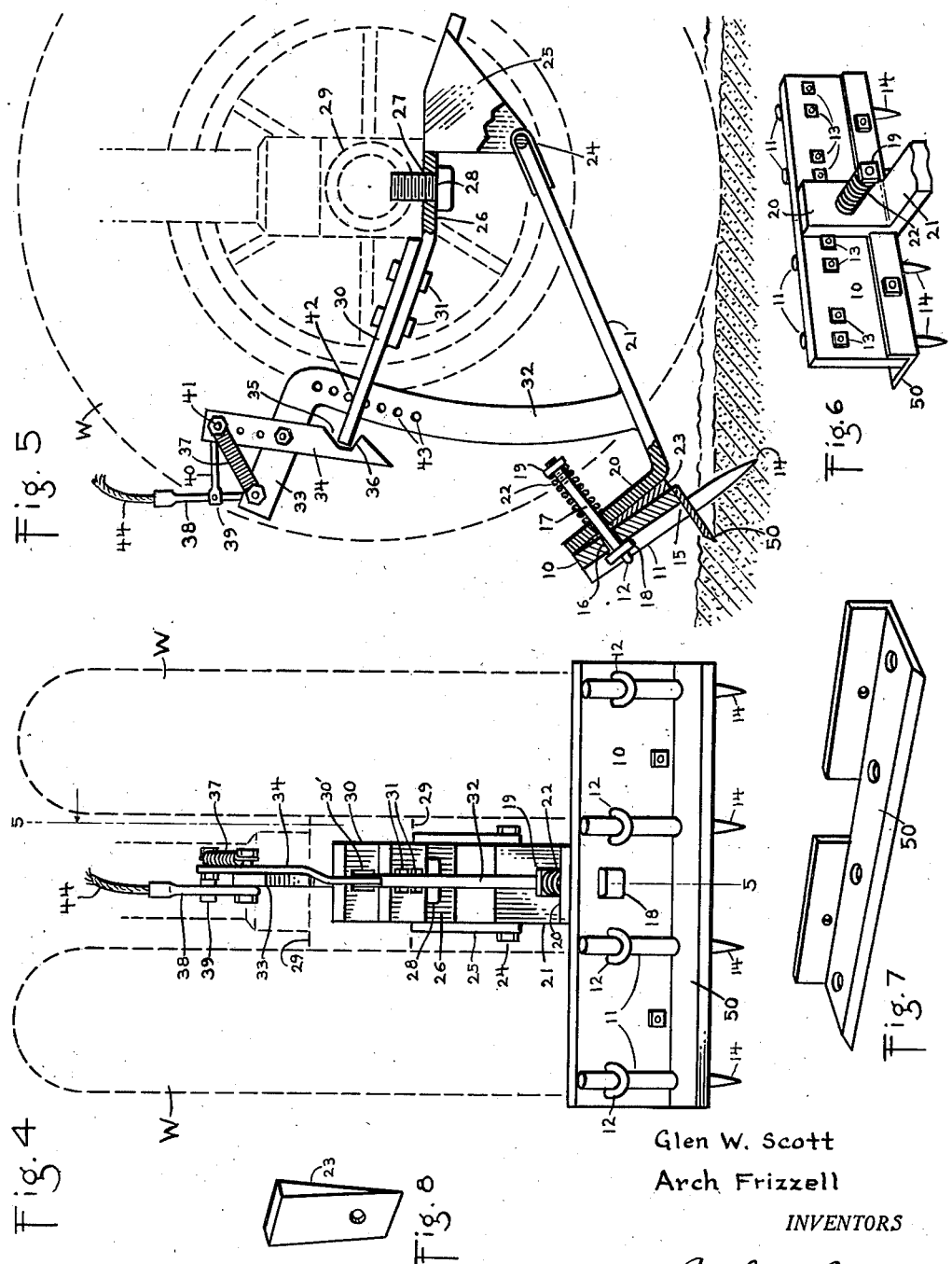

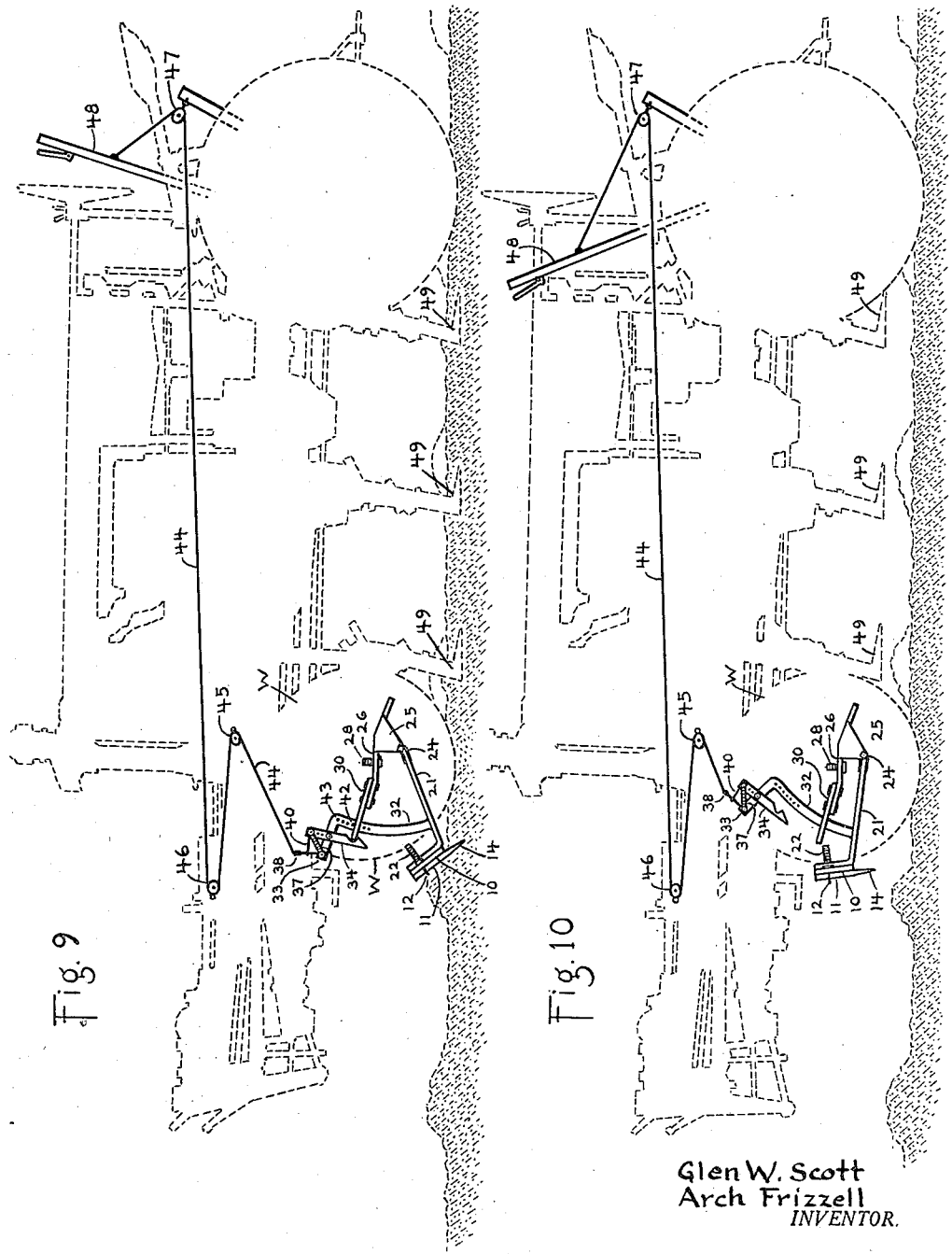

Patented Feb. 16, 1937

2,070,964

UNITED STATES PATENT OFFICE 2,070,964

TRACK LEVELER FOR TRACTORS

Glenn W. Scott, Mount Zion, and Arch Frizzell, Decatur, Ill.

Application August 10, 1936, Serial No. 95,194

5 Claims. (Cl. 97—47)

This invention relates primarily to cultivating implements of the wheel type and particularly to riding cultivators operated by means of a motor tractor.

Since the adoption of pneumatic rubber tired wheels for cultivator tractors a serious problem has prevailed with such implements in that the two guide wheels running side by side and spaced only a short distance from each other react with extreme sensitiveness to uneven ground such as the ridges formed by the cultivating sweeps or plows used with cultivators. When it is later desired to cultivate the field at an angle to such ridges, they cause the tractor to bounce up and down, thus not only interfering with the function of the cultivating implements and causing irregularity in the operation of the motor, but also rendering it difficult and uncomfortable for the operator to ride in the seat of the tractor.

Our invention consists essentially of a scraper which precedes the two center wheels to scrape off the previously formed ridges in front of the two wheels so that they will have a perfectly level trackway over which to travel; this scraper being so mounted on the frame of the tractor as to be capable of convenient adjustment to operative and inoperative positions, respectively, from the operator's seat irrespective of whether the tractor is in motion.

In conjunction with the scraper referred to we provide means for breaking the crust of earth to facilitate its removal by the scraper, the crust breaking means preferably consisting of a plurality of sharp pointed teeth secured to the front face of the scraper and projecting some distance below the cutting edge thereof.

Therefore, the primary object of our invention is to provide a simple and inexpensive device for breaking up and leveling the earth in front of the center wheels of a cultivator tractor when cultivating cross-wise of ridges formed by previous cultivation.

Another important object of our invention is to provide a device such as that referred to with positive means for breaking up the earth in front thereof.

A further object of our invention is to provide such a device as that referred to with means for easy adjustment to operative and inoperative positions, respectively, from the operator's seat while the tractor is in motion or at rest as may be desired.

Further specific objects will appear upon reference to the drawings and specification forming a part of this application.

In the drawings:

Fig. 1 is a perspective view of our improved earth leveling device in lowered, or operative, position;

Fig. 2 is a view similar to Fig. 1 with a lifting cable taut and the latch unfastened preparatory to lifting the scraper;

Fig. 3 is a view similar to Figs. 1 and 2 but with a scraper in lifted, or inoperative, position;

Fig. 4 is a front elevation of our device, showing a modified form of scraper;

Fig. 5 is a side elevation partly in cross section taken on the line 5—5 of Fig. 4;

Fig. 6 is a perspective view of the modified form of scraper shown in Figs. 4 and 5 looking from the rear;

Fig. 7 is a perspective view of the modified scraper blade shown in Figs. 4, 5 and 6;

Fig. 8 is a perspective view of a shim shown in Fig. 5;

Fig. 9 is a side elevation in outline of a conventional cultivator tractor showing our improved earth leveling device attached thereto and in lowered, or operative, position; and Fig. 10 is a view similar to Fig. 9 with the leveling device in lifted, or inoperative, position.

Referring to the drawings by numerals, wherein like numerals designate like parts, the scraper member 10 has secured to its front face a plurality of pins or teeth 11 by means of U-shaped bolts 12 and nuts 13, said teeth having relatively sharp points 14 extending a short distance below the scraping or cutting edge 15 of the scraper member for the purpose of breaking up the earth in front of the scraper member. Said member 10 has a central aperture 16 through which extends a bolt 17 provided at its front end with a head 18 and at its other end with an adjustable nut 19. This bolt also extends through an angular extension 20 of a supporting member 21 with a relatively strong helical spring 22 interposed between the nut 19 and the rear face of the extension 20 to secure the scraper member 10 firmly to the supporting member 21, and at the same time permit slight yielding of the connection when the scraper member strikes a solid object. If desired a shim 23 (shown in Figs. 5 and 8) may be interposed between the scraper member 10 and the angular extension 20 of the supporting member 21. This supporting member 21 is hingedly connected at 24 to a bracket 25 having formed integrally therewith a horizontally disposed arm 26 having therein an aperture 27 through which projects a machine screw 28 to secure said arm to the end of the wheel bearing 29. An extension plate 30 having a slot 30' next its outer end is bolted at 31 to the member 26 for a purpose to be later explained. The rear end of the plate 30 abuts the edge of the bearing 29 as shown.

A vertically extending arm 32 is welded or otherwise rigidly secured to the supporting member 21, rearwardly of the angular extension 20, and extends through slot 30', terminating at its upper end in a substantially horizontal arm 33 intermediate of which is pivotally mounted a latch 34 having formed therein a notch 35 having its lower face 36 at a slight angle to the plate 30 so that the engagement of this plate in the slot will be such as to be capable of ready disengagement.

A helical spring 37 is secured to the upper end of the latch 34 and to the outer end of the arm 33 to hold said latch in engagement with the end of the plate 30.

A lever 38 is pivotally mounted in the outer end of the arm 33 and has connected thereto at 39 a link 40 which is connected at its other end at 41 to the end of the latch 34.

A stop pin 42 is inserted in one end of a series of holes 43 to limit the downward movement of the arm 32 which carries the scraper member 10. This pin may be placed in such hole 43 as will adjust the scraper member 10 and teeth 11 to the desired depth.

Secured to the outer end of the lever 38 is a cable 44 which extends over pulleys 45, 46 and 47 to a lever 48 which lever is ordinarily used to lower and raise the cultivating sweeps 49 (shown in dotted lines in Figs. 9 and 10). When it is desired to lift the scraper member to inoperative position the lever 48 is moved forwardly, thus forcing the lever 38 rearwardly as shown in Fig. 2. This movement forces latch 34 to disengaged position, and further movement of the lever 48 will lift the scraper 10 to its uppermost position as shown in Fig. 3.

For most soils the scraper member 10 may consist of a single plate as shown in Figs. 1 to 3, and 9 to 10 inclusive. However, for very hard earth it may be desirable to attach a cutter blade 50 to the scraper member 10 as shown in Figs. 4 to 6 inclusive. This plate is detachably secured to the member 10 by means of bolts 50 or other suitable means, as shown.

In operation, it is necessary for the operator only to manipulate the lever 48, moving it either forward or backward to adjust the scraper member to operative or inoperative position, as desired, without stopping the tractor or moving from his seat thereon.

It will be observed that the scraper plate 10 and teeth 11 are inclined at a sharp angle to the surface of the earth. This arrangement causes the scraper automatically to spring upwardly when a solid object in the ground is encountered, thus disengaging the latch 34 and permitting the scraper to ride over the object. It will then drop back to its operative position.

With our improved earth leveling device the tractor is enabled to travel smoothly along as the scraper member 10 scrapes away all ridges and uneven surfaces in front of the two guide wheels W which travel between the rows of plants.

Although we have illustrated a preferred structure for accomplishing the objects referred to, it is to be understood that changes may be made within the scope of the following claims without departing from the spirit of our invention.

We claim:

1. An earth leveler for tractor wheels comprising a substantially rectangular scraper plate having a plurality of teeth secured to its front face and extending below the scraping edge of said plate, a substantially horizontally disposed vertically adjustable arm yieldably secured to the rear face of said plate, said arm being hingedly connected to a substantially horizontally extending fixed arm having a slot in its outer end, a substantially vertically extending arm secured to said vertically adjustable arm and projecting through said slot and having its upper end terminating in a substantially horizontally extending arm, a spring controlled latch pivotally mounted on said horizontal arm, a lever pivotally mounted on the extreme end of said horizontal arm, a link connecting said lever with the end of said latch, a slot in the lower end of said latch to engage the outer end of the said substantially horizontally extending fixed arm, means for securing said fixed arm hingedly to a tractor body, and a cable attached to the end of said lever for lifting or lowering said scraper plate to operative and inoperative position, respectively.

2. An earth leveling device for tractor wheels comprising a substantially rectangular scraper plate provided on its front face with a plurality of teeth, the points of which project below the scraping edge of said plate for the purpose of breaking up the crust of the earth, a yieldable connection between said plate and a substantially horizontally disposed vertically adjustable arm, a hinged connection between the rear end of said vertically adjustable arm and a tractor body, latch means mounted on said vertically adjustable arm for maintaining said plate in lowered position with respect to said tractor body, and manual means consisting of a cable attached to a lever carried by said tractor for lifting and lowering said arm and plate.

3. In an earth leveling device, a scraper plate, a substantially horizontally disposed vertically adjustable arm secured to said plate, a substantially vertical arm mounted on said vertically adjustable arm, a pivoted latch member mounted on a horizontally disposed extension of said vertical arm, a slot in the lower end of said latch adapted for engagement with the end of a latch arm hingedly connected at its rear end to said vertically adjustable arm, adjustable means carried by said vertical arm for limiting the downward movement of said vertically adjustable arm, means mounted on said horizontal extension for disengaging said latch, and cable means for actuating said latch and lifting and lowering said vertically adjustable arm, respectively.

4. In an earth leveler for tractor wheels, a substantially rectangular plate having a cutting blade mounted on its lower edge, said blade extending forwardly of said plate in a slightly angularly disposed relation to the surface of the earth, and a series of teeth secured to the front face of said plate, and extending through apertures in said blade a slight distance below said blade.

5. In an earth leveler for tractor wheels, a substantially rectangular scraper plate, a supporting arm yieldably connected to said plate and a tapered wedge or shim interposed between said plate and supporting arm.

GLENN W. SCOTT.
ARCH FRIZZELL.